(12) United States Patent
Yokomichi

(10) Patent No.: US 6,933,456 B2
(45) Date of Patent: Aug. 23, 2005

(54) SMALL HOLE ELECTRICAL DISCHARGE MACHINING METHOD AND SMALL HOLE ELECTRICAL DISCHARGE MACHINING APPARATUS AND ELECTRODE INSERTING METHOD AND ELECTRODE INSERTING APPARATUS

(75) Inventor: Shigeharu Yokomichi, Atsugi (JP)

(73) Assignee: Elenix, Inc., Kanagawa-ken (JP)

( * ) Notice: Subject to any disclaimer, the term of this patent is extended or adjusted under 35 U.S.C. 154(b) by 0 days.

(21) Appl. No.: 10/681,347

(22) Filed: Oct. 9, 2003

(65) Prior Publication Data

US 2005/0077269 A1    Apr. 14, 2005

(51) Int. Cl.[7] ................................................ B23H 7/26
(52) U.S. Cl. ............................ 219/69.17; 219/69.14; 219/69.2
(58) Field of Search ................... 219/69.14, 69.17, 219/69.2

(56) References Cited

U.S. PATENT DOCUMENTS

| | | | | |
|---|---|---|---|---|
| 3,939,321 A | | 2/1976 | Bertrand et al. ......... | 219/69.14 |
| 5,041,709 A | * | 8/1991 | Schneider et al. ....... | 219/69.15 |
| 5,416,289 A | | 5/1995 | Tanaka .................... | 219/69.14 |
| 6,127,642 A | * | 10/2000 | Gleason et al. .......... | 219/69.15 |
| 6,344,624 B1 | | 2/2002 | Moro et al. .............. | 219/69.14 |
| 6,576,858 B1 | | 6/2003 | Yokomichi ................ | 219/69.2 |
| 6,806,435 B2 | * | 10/2004 | Ishiwata et al. ........... | 219/69.2 |
| 2002/0047538 A1 | | 4/2002 | Baiardi et al. | |
| 2002/0148814 A1 | | 10/2002 | Ishiwata et al. ........... | 219/69.2 |
| 2003/0029843 A1 | | 2/2003 | Barbulescu ............. | 219/69.14 |

FOREIGN PATENT DOCUMENTS

| | | | |
|---|---|---|---|
| JP | 59-201725 | | 11/1984 |
| JP | 9-174341 | | 7/1997 |
| JP | 2001-170820 A | * | 6/2001 |

OTHER PUBLICATIONS

English Language Abstract JP 59-201725, no publication date.
English Language Abstract JP 9-174341, no publication date.

* cited by examiner

*Primary Examiner*—Geoffrey S. Evans
(74) *Attorney, Agent, or Firm*—Greenblum & Bernstein, P.L.C.

(57) ABSTRACT

A small hole electrical discharge machining apparatus includes an electrode holder that holds an upper part of an electrode, an electrode guider that guides a lower part of the electrode, a jet nozzle that injects water jet to the electrode holder, and a fluid channel that supplies a gas, such as air, to an electrode guide of the electrode guider. The electrode is guided with the water jet toward the workpiece, such that small hole electrical discharge machining is performed while the gas is being released from the electrode guide into a working liquid via the fluid channel.

5 Claims, 6 Drawing Sheets

SMALL HOLE ELECTRICAL DISCHARGE MACHINING METHOD AND SMALL HOLE ELECTRICAL DISCHARGE MACHINING APPARATUS AND ELECTRODE INSERTING METHOD AND ELECTRODE INSERTING APPARATUS

BACKGROUND OF THE INVENTION

1. Field of the Invention

The present invention relates to a small hole electrical discharge machining method and a small hole electrical discharge machining apparatus, and an electrode inserting method with respect to an electrode guide of the small hole electrical discharge machining apparatus and an electrode inserting apparatus.

2. Description of the Related Art

In a conventional small hole electrical discharge machining apparatus, a stick-shaped, or pipe-shaped, slender electrode is rotatably supported by a main-axis portion. The main-axis portion is moved up/down by a feed screw that is rotated by a main-axis feed motor. By doing so, a lower end portion of the electrode is caused to come near to a workpiece and electrical discharge is caused to occur from the electrode. Thereby, a small hole is drilled. Then, an electrode guide member guides the lower end portion of the electrode to a proper accurate position.

Also, conventionally, to insert the stick-shaped (or pipe-shaped) slender electrode into the electrode guide member, a water jet jetted from an upper part of the stick-shaped electrode enveloping the water jet to feed the stick-shaped electrode up to the electrode guide member.

Incidentally, in the small hole electrical discharge machining that uses the stick-shaped electrode, in order to prevent a fusion-cutting of the electrode due to the electrical discharge, steps of the small hole electrical discharge machining method are executed in a state where the workpiece is placed within a working tank filled with a working liquid such as water or deionized water.

However, in the conventional small hole electrical discharge machining method and apparatus, dirty water from a worked portion enters an interior of the electrode guide, thereby the electrode guide got clogged or plugged. Hence, it is difficult to perform a long-term stable electrode feeding, and therefore continuous working was limited to one performed for approximately 2 hours or to one wherein the number of the worked holes was 1,000 pieces or so. Further, metal ions in the working liquid were reduced and the resulting material accreted onto the electrode guide. Resultantly, a hole of the electrode guide became small in diameter, and therefore, it is difficult to perform long-term stable electrode feeding.

Also, the conventional electrode inserting step inserting the electrode into the electrode guide, it is difficult to insert the electrode having a very small diameter such as 0.01 mm, 0.02 mm, and 0.03 mm.

The present invention has been made in order to solve the above-described problem and has an object to provide an electrode inserting method and apparatus that make more reliable the insertion of a very fine stick-shaped electrode into the electrode guide, and to provide a small hole electrical discharge machining method and apparatus that prevent entry of the dirty water, occurring within the working liquid, into the electrode guide, as well as reduction of the metal ions in the working and subsequent attachment of the resulting material onto the electrode guide, to enable stable feeding of the electrode and hence enhance the working accuracy.

SUMMARY OF THE INVENTION

To attain the above object, A small hole electric discharge machining method using a small hole electrical discharge machining apparatus having electrode holding means for holding an upper part of an electrode and electrode guide means for guiding a lower part of the electrode, the electrode being fed to a workpiece while the electrode is being rotated, the method comprising: a supplying step supplying a gas to an electrode guide of the electrode guide means; a releasing step releasing the gas into a working liquid from the electrode guide; and a machining step performing small hole electrical discharge machining.

DETAILED DESCRIPTION OF THE INVENTION

Figure 1:
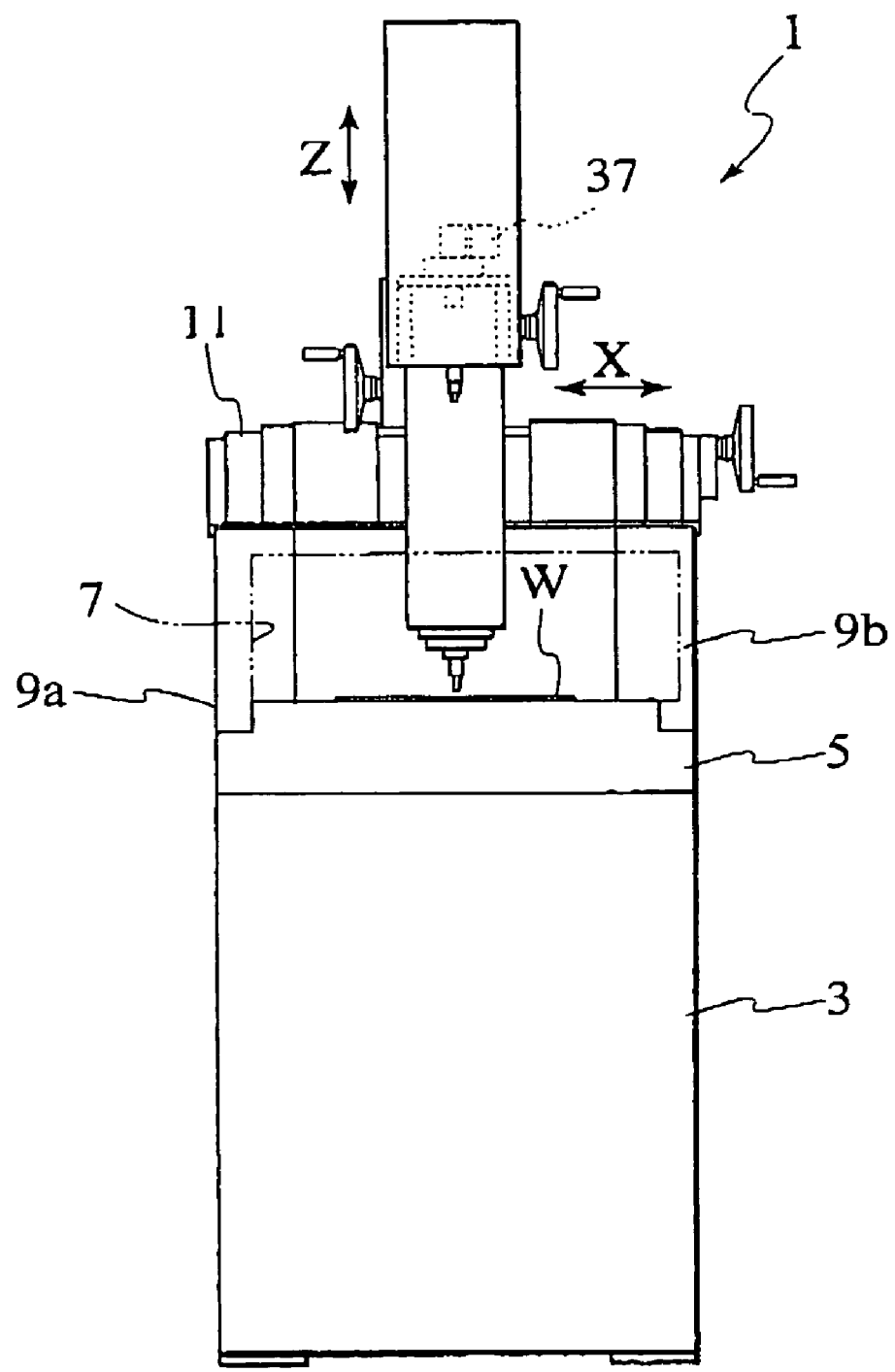
FIG. 1 is a front view of a small hole electrical discharge machining apparatus according to the present invention.
Figure 2:
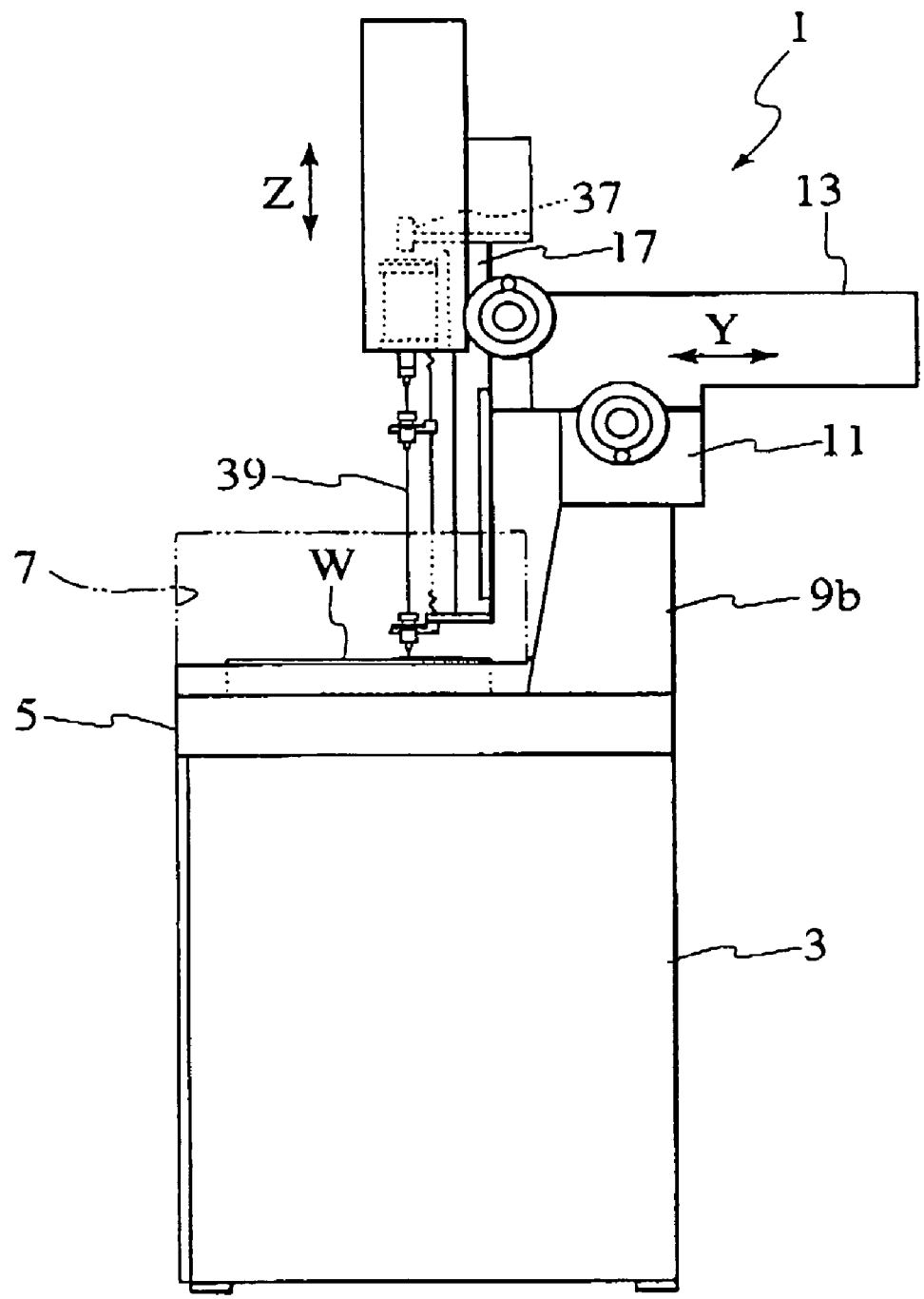
FIG. 2 is a right side view of the small hole electrical discharge machining apparatus according to the present invention.

An embodiment of the present invention will hereafter be explained with reference to FIGS. 1 to 7.

A small hole electrical discharge machining apparatus 1 according to the present invention comprises a pedestal 3, a work table 5 fixing a workpiece W and provided on the pedestal 3, and a work tank 7 provided on the work table 5 for containing the workpiece W. Also, at the rear (on the right side of FIG. 2) of the work table 5, columns 9a and 9b upwardly extending from the work table 5 are provided.

On the columns 9a and 9b, an X-axial carriage 11 that can be freely moved and positioned in X directions (see FIG. 1) is provided. On the X-axial carriage 11, a Y-axial carriage 13 that can be freely moved and positioned in Y directions intersecting the X directions is provided.

Figure 3:
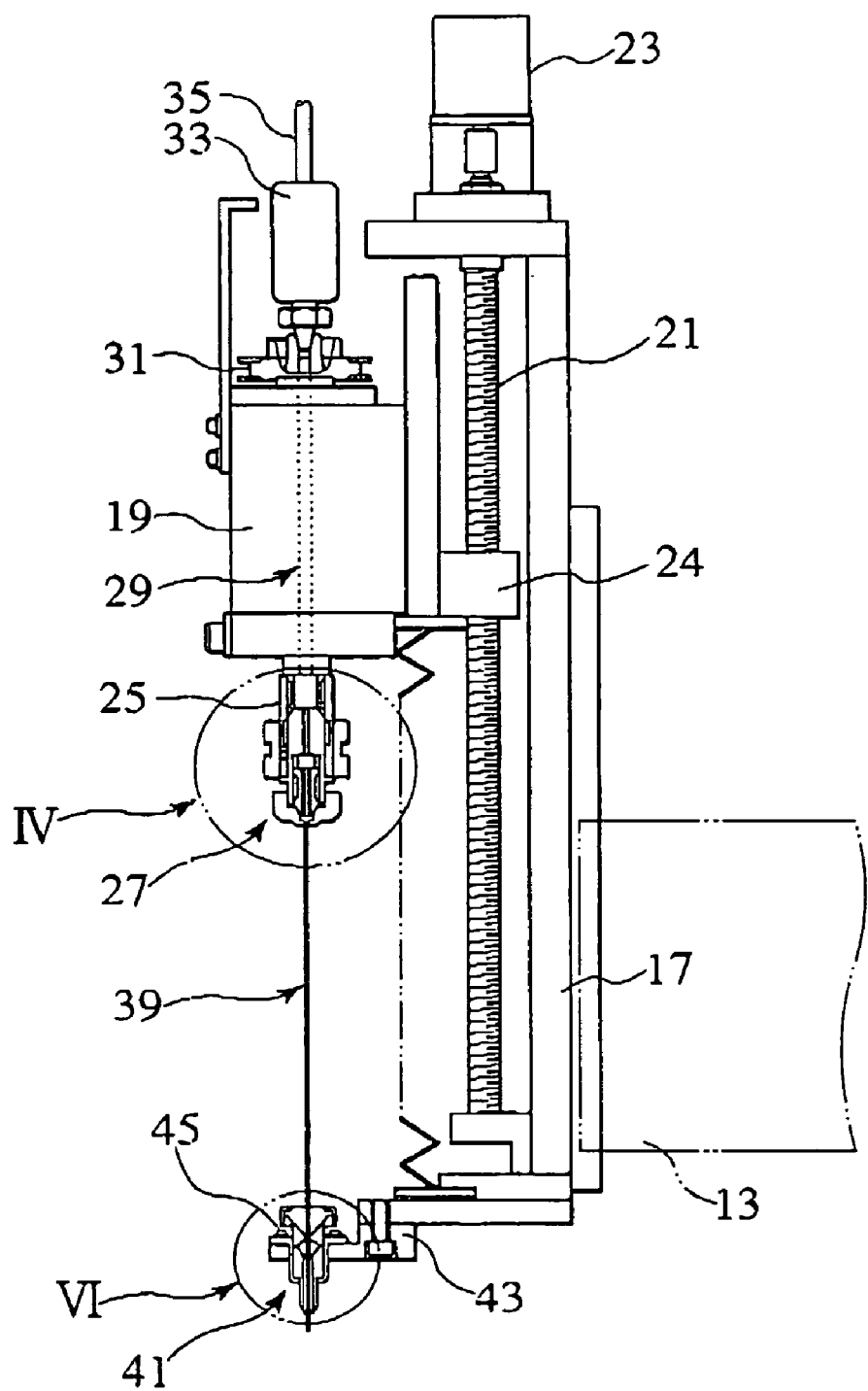
FIG. 3 is an enlarged view of a Z-axial slide portion in FIG. 2.

Referring to FIG. 3, on the front end (the left side end portion in FIG. 2) of the Y-axial carriage 13, a slide base 17 is attached, and the slide base 17 is configured to freely move in vertical direction. With respect to this slide base 17, a Z-axial slider 19 is engaged with a guide member (not shown), and the Z-axial slider 19 is configured to freely move in vertical direction (Z directions).

A Z-axial feed screw 21 extending in Z directions is rotatably supported by the slide base 17. A servo motor (first motor) 23 driving and rotating the Z-axial feed screw 21 is provided on an upper end portion of the Z-axial feed screw 21. Also, onto that Z-axial feed screw 21, there is screwed a nut 24 that is attached to the Z-axial slider 19.

Accordingly, by appropriately rotating and driving the Z-axial feed screw 21 by the servo motor 23 under the control of a control device (not shown), it is possible to move the Z-axial slider 19 to a desired position in the Z directions.

An electrode holding means 27 equipped with a one-touch coupler 25 is rotatably provided on a lower portion of the Z-axial slider 19. Also, a hollow rotation shaft 29 upwardly extending through the Z-axial slider 19 and the one-touch coupler 25 is fixed to the electrode holding means 27. On an upper end portion of the rotation shaft 29, a pulley 31 such as a timing pulley for rotating a shaft is provided. Also, the upper end of the hollow rotation shaft 29 is connected, via a rotary joint 33 and a pipeline 35, to a water supply device (not shown). Further, the pulley 31 is connected, via a drive belt (not illustrated), to a drive pulley (not shown) being provided to an electrode motor (second motor) 37 for rotating an electrode.

Accordingly, the water that is supplied from the water supply device is supplied to the electrode holding means 27 by passing through a hollow portion of the hollow rotation shaft 29. Also, the electrode holding means 27 is driven by the electrode motor 37.

A lower portion of the electrode holding means 27, an electrode guide means 41 for guiding a tip end of a stick-shaped, or pipe-shaped electrode 39 (hereinafter, called the electrode 39) is provided. The electrode guide means 41 is fixed to a support plate 43 that is integrally provided to a lower end portion of the slide base 17, by a fastening member 45 such as a bolt, etc.

Figure 4:
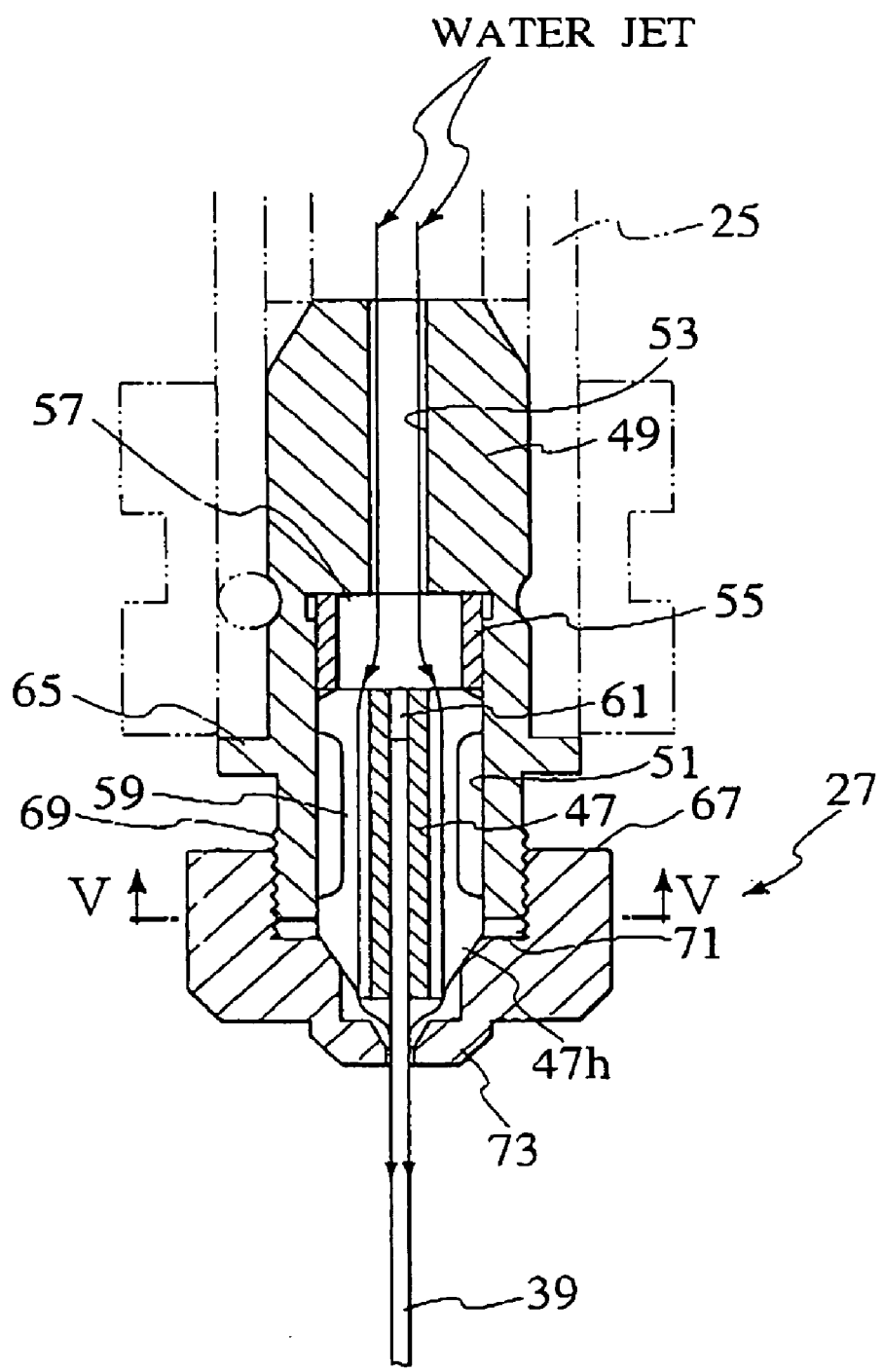
FIG. 4 is an enlarged explanatory view of a IV portion in FIG. 3.

The electrode holding means 27, as illustrated in FIG. 4, has a collet 47 that holds a tip end of the electrode 39. The collet 47 is removably inserted into a collet holding hole 51 that is formed in a collet holder 49 for holding the collet 47, and the collet holder is downwardly open. Also, this collet holding hole 51 has formed with respect thereto an aqueduct 53 that communicates with the hollow hole of the rotation shaft 29.

A ring spacer 55 is inserted between an upper portion of the collet holding hole 51 and the collet 47, and the diameter of the ring spacer 55 is approximately the same as diameter of the collet 47. In the interior of the ring spacer 55, a reserve chamber 57 for storing water that is supplied from the aqueduct 53 is formed.

Figure 5:
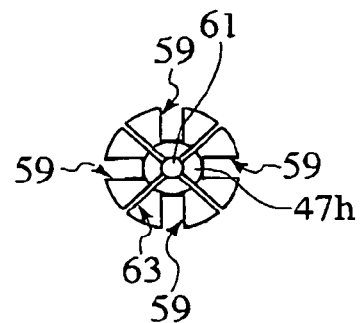
FIG. 5 is a sectional view taken along a line V—V of FIG. 4.

As shown in FIGS. 4 and 5, in the outer periphery of the collet 47, four aqueduct grooves 59 communicating from the reserve chamber 57 to a tip end 47*h* of the collet 47.

Incidentally, in the tip end 47*h* of the collet 47, x-shaped cut grooves 63 are formed. Each of cut grooves 63 reaches a chuck hole 61 of the collet 47, and therefore the tip end 47*h* can be easily elastically deformed. Also, on the outer periphery of a lower portion of the collet holder 49, a flange-shaped engaging portion 65 abutting a lower end portion of the one-touch coupler 25 is provided.

On the lower end portion of the collet holder 49, a collet fixing member 67 for fastening the collet 47 is provided, and the collet fixing member 65 is configured to engage with a tapered portion at the tip end of the collet 47. The collet fixing portion 67 further comprises a female screw 71 being screwed into a male screw 69 at the lower end portion of the collet holder 49. By rotating the collet fixing member 67, it is possible to perform releasing or fixing of the collet 47.

Also, the collet fixing member 67 further comprises a jet nozzle 73 that causes water, which downwardly flows out from the four aqueduct grooves 59 of the collet 47, to be made a water jet (WJ) and injected in such a manner that it encloses, or wraps, the stick-shaped electrode 39.

Figure 6:
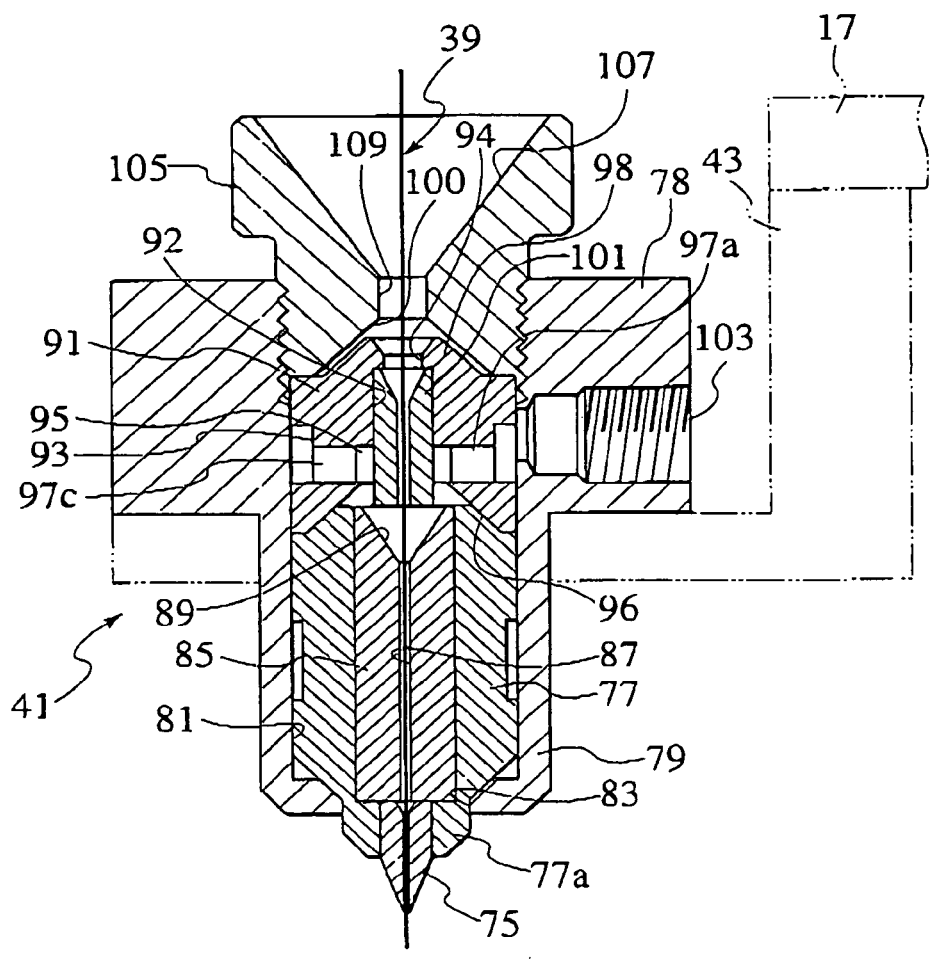
FIG. 6 is an enlarged explanatory view of a VI portion in FIG. 3.

On the other hand, the electrode guide means 41, as shown in FIG. 6, further comprises an electrode guide sleeve 77 having an electrode guide 75 for vertically guiding, with respect to the workpiece W, the lower end portion of the stick-shaped electrode 39 being fitted to the electrode holding means 27.

More specifically, a lower end portion of the electrode guide sleeve 77 is formed into a small-diameter portion 77*a* the diameter of which is small as compared to that of a body portion of the electrode guide sleeve 77. A ceramic-made electrode guide 75 is forcedly inserted into the small-diameter portion 77*a*, and therefore the electrode guide sleeve 77 is integrally formed with the electrode guide 75. The reason for inserting the electrode guide 77*a* is to protect the electrode guide 77*a* by the electrode guide sleeve 77 that has been made of a high-toughness material (for example, metal).

To a support plate 43 provided on the lower end of the slide base 17, there is fixed by a fastening member (not shown) such as a bolt an electrode holder 79 having a flange portion 78 at its upper part. In the electrode holder 79, there is formed a fixing hole 81 for fixing the electrode guide sleeve 77 and other parts, which is upwardly open. In the bottom portion of that fixing hole 81, there is formed a small hole (small-diameter fixing portion) 83 the diameter of which is smaller than that of the fixing or fitting hole 81.

The electrode guide sleeve 77 has a stepped portion thereof, and the electrode guide sleeve 77 is loaded to the electrode holder 79 so as to abut the stepped portion on a bottom portion of the electrode holder 77, and the small-diameter portion 77*a* projects from the small-diameter hole 83 located at the bottom portion of the electrode holder 79.

At a center-axial part of the electrode guide sleeve 77, an inner sleeve 85 coaxial with the electrode guide 75 is fitted. At the center-axial part of the inner sleeve 85, an electrode guiding hole 87 is formed, and the diameter of the electrode guiding hole 87 is somewhat greater than that of the electrode guide 75. An upper end surface of the inner sleeve 85 is flush with the upper surface of the electrode guide sleeve 77. In the upper end surface of the inner sleeve 85, a first funnel portion 89 converging from upper end surface of the inner sleeve 85 toward the electrode guiding hole 87 is formed. Additionally, chamfering is applied, on a somewhat large scale, to the outer periphery of the upper end surface of the electrode guide sleeve 77.

On the electrode guide sleeve 77, provided a spacer 91 is provided. In the undersurface of the spacer 91, a countersunk hole 96 that is engaged with the chamfered portion of the upper end surface of the electrode guide sleeve 77 is formed. On an upper end surface of countersunk hole 96, a projection portion 98 is formed protruding upwardly convex.

The spacer 91 further comprises a fixing hole 92, and a ceramic-made electrode guide 101 is inserted to the fixing hole 92 and fitted coaxially with the electrode guide 75.

Incidentally, the upper electrode guide 101 is fitted into, and held by, the spacer 91 such that, when the countersunk hole 96 of the spacer 91 has been brought into engagement with the chamfered portion of the electrode guide sleeve 77, the lower end surface of the electrode guide 101 abuts on the upper end surface of the inner sleeve 85.

Also, an outer ring-shaped groove 93 is formed in the outer-peripheral portion of the spacer 91. An inner ring-shaped groove 95 that is open toward the lower end of the spacer 91 is formed with respect to around the upper electrode guide 101 constructing the central part of the spacer 91. Four fluid channels 97 (a, b, c, and d) are communicating from the outer ring-shaped groove 93 to the inner ring-shaped groove 95. Also, in the flange portion 78 of the electrode holder 79, a gas supply port 103 communicating with the outer ring-shaped groove 93 is provided.

Also, in the upper part of the fitting hole 92, an open hole 94 opening to the upper part of the spacer 91 is provided.

Accordingly, a gas that has been supplied from a gas supply source (not shown) to the gas supply port 103 is supplied to the first funnel portion 89 of the inner sleeve 85 via the outer ring-shaped groove 93, fluid channel 97 (a, b, c, and d), and inner ring-shaped groove 95.

The gas that has been supplied to the first funnel portion 89 is supplied to the electrode guide 75 by way of the electrode guiding hole 87 of the inner sleeve 85. Incidentally, the clearance between the electrode 39 passing through the electrode guide 75 and this electrode guide 75 is to an extent of 0.001 to 0.002 mm or so. During electrical-discharge machining, the gas is released into the working liquid (ordinarily an aqueduct water or deionized water) via the clearance.

On the inner surface of the fitting hole 81 of the spacer 91, a female screw portion is formed. A male crew of a fixing member 105 is screwed with the female screw of the fitting hole 81. Furthermore, in the undersurface of the fixing member 105, a recess portion 100 is formed, and the recess portion 100 is configured to fit the convex portion 98 of the upper surface of the spacer 91.

By screwing the fixing member 105 into with the female screw portion of the electrode holder 79, the electrode guide sleeve 77 and the spacer 91 can be press-fixed to a desired position of the fitting hole 81 of the electrode holder 79.

In this state, the fixing member 105 is projected to the outer side of the fitting hole 81 of the electrode holder 79. A second funnel portion 107 upwardly opening is formed on the upper part of fixing member 105. In the bottom portion of the second funnel portion 107, a small hole 109 that is faced to the open hole 94 of the spacer 91 is formed. Incidentally, the diameter of each of the opening 94 and small hole 109 has a size permitting the stick-shaped electrode 39 and the water of the water jet to pass therethrough.

In a case of performing small hole electrical discharge machining by the above-constructed small hole electrical discharge machining apparatus 1, the upper portion of the stick-shaped electrode 39 is fitted into the collet 47 of the electrode holding means 27. Then, supply of water is performed from the water supply device to the electrode holding means 27. If doing so, the water jet (WJ) that envelopes the electrode 39 is jetted from the jet nozzle 73 after passing through the reserve chamber 57 of the electrode holding means 27 and the aqueduct grooves 59 around the outer periphery of the collet 47. As a result of this, the stick-shaped electrode 39 that is to an extent of 0.010 to 0.200 mm or so in thickness can be fed straight forwards from the electrode holding means 27 to the electrode guide means 41 without being curved or bent by the reactive force that occurs due to the friction between the electrode 39 and the electrode guide 75.

Also, since the electrode is enveloped with the water jet (WJ), it is possible to suppress the flexure of the electrode 39 that occurs due to the rotation of it. This enables performing small-hole machining with a high accuracy.

Further, during working, a gas is supplied to the electrode guide 75 of the electrode guide means 27 and, while the gas is being released from the electrode guide 75 into the working liquid, small hole electrical discharge machining is performed. By doing so, it results that machining is done in such a way that the electrode 39 is supported by the gas. This enables making very low the friction resistance between the electrode guide 75 and the electrode 39.

As the gas that is supplied to the electrode guide, there is ordinarily used an air that is free of cost. However, other than air, it is also possible to use a gas such as, for example, nitrogen, hydrogen, oxygen, argon, helium, or carbon dioxide gas. Also, the temperature of the gas that is supplied, preferably, is low and, desirably, is around 4?C. The pressure of the gas that is supplied, desirably, is 0.05 to 1.00 (kg/cm$^2$) or so in terms of gage pressure at the gas supply port 103 portion of the electrode guide means.

As stated above, by supplying a gas to the electrode guide 75 during working, dirty water from the portion where working is performed does not enter the electrode guide 75. Therefore, the electrode guide 75 does not get clogged. This enables performing long-term stable electrode feeding.

Also, since the metal ions within the working liquid are prevented from being reduced and the resulting material is prevented from attaching onto the electrode guide, by the gas, it is possible to prevent the hole of the electrode guide from gradually becoming small. As a result of this, long-term stable electrode feeding has become possible.

Also, in the prior art, the distance between the electrode guide and the workpiece needs to be 0.3 to 0.5 mm, in the present invention, the distance can be shortened to 0.05 to 0.20 mm. And therefore, the working accuracy is enhanced. Specifically, whereas in the prior art, the minimum diameter of machined holes when having used an electrode whose diameter was 0.03 mm was to an extent of 0.060 mm or so, in the present invention, it has become possible to make the minimum diameter fall within the range of 0.050 to 0.052 mm.

Incidentally, in the above-described embodiment, an explanation has been given of an example of the small hole electrical discharge machining apparatus, wherein the jet nozzle for producing a water jet is provided to the electrode holding means; and the stick-shaped electrode is guided with that water jet and, while it is being rotated simultaneously therewith, is fed toward the workpiece. However, there is also known the one, wherein no water jet is used to guide the stick-shaped electrode to the electrode guide means.

For example, there is also a small hole electrical discharge machining apparatus, wherein, between the electrode holding means and the electrode guide means, two intermediate guiding means each for guiding the stick-shaped electrode are disposed in such a way that the both are spaced by an appropriate distance from each other in the up-and-down direction. These intermediate guiding means are disposed such that, when the electrode holder is downwardly moved, they can be horizontally retracted in order to avoid interfering with the electrode holder.

Also, the present invention exhibits a great effect when small-hole machining is performed using an electrode the diameter of which is from 0.2 mm to 0.01 mm.

Figure 7:
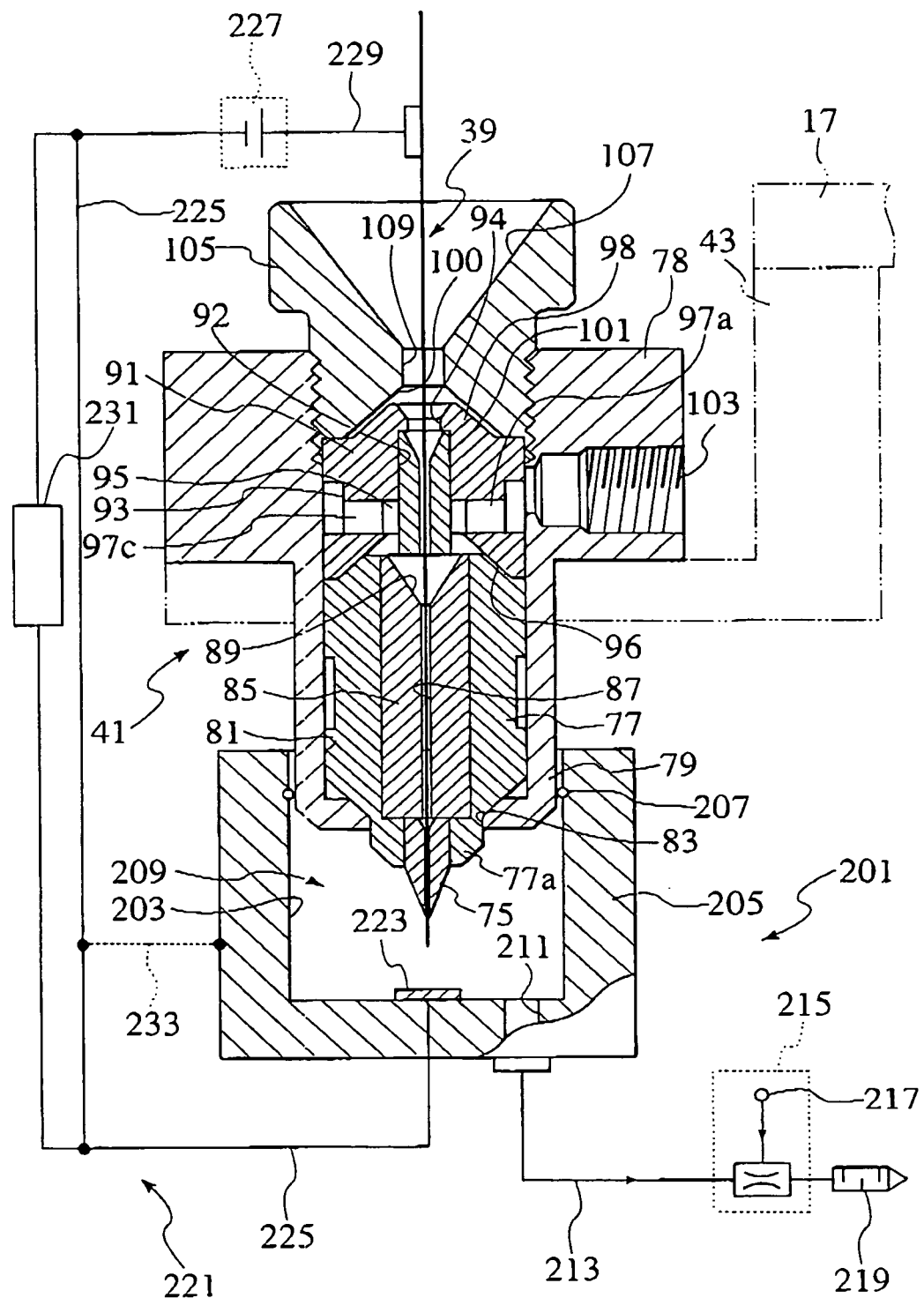
FIG. 7 is an explanatory view of an electrode inserting apparatus according to the present invention.

FIG. 7 illustrates an example in which an electrode inserting apparatus 201 usable with respect to the electrode guide is applied to the above-described small hole electrical discharge machining apparatus 1.

The electrode inserting apparatus 201 is installed at a predetermined position within the work tank 7 of the small hole electrical discharge machining apparatus 1. The "predetermined position" is a position near the working position in which the work piece W is machined. The electrode inserting apparatus 201 is desirably installed at a position as close to the working position as possible.

The electrode inserting apparatus 201 has provided therein a vacuum aspiration head 205 attachable with/detachable from a lower part of the electrode guide means 41. This vacuum aspiration head 205 has formed therein a hollow-cylindrical recess portion 203 that is upwardly open. The recess portion 203 is formed such that the recess portion 203 can be engaged with a lower part of the electrode holder 79 constructing the electrode guide means 41 in the way that the recess portion 203 is slidable with respect thereto in the Z-axial direction and hermetically sealable with respect thereto.

Incidentally, in order to keep that lower part and recess portion 203 in a hermetically sealed state therebetween, in this embodiment, a seal member 207 is fitted to the inside-diameter portion of the recess portion 203. However, even when, in place of using the seal member 207, setting the engagement clearance of the mutually engaged portion to be at a small value, it is possible to obtain performance capable of resisting the practical use.

By the engagement between the recess portion 203 of the vacuum aspiration head 205 and the lower part of the electrode holder 79, a sealed space 209 is formed between those elements. To exhaust the air within that sealed space 209, exhaust means 215 is connected, via a pipeline 213, to an exhaust hole 211 formed in the bottom portion of the recess portion 203.

In this embodiment, as the exhaust means 215, there is illustrated an aspirator type vacuum aspiration device that, using an air which flows out from an air pressure source 217 with a high speed, exhausts the air within the sealed space 209 via a silencer 219. Also, a vacuum pump may also be used.

Next, the construction of electrode penetration detecting means 221 for detecting the penetration of the electrode through the electrode guide means 41 will now be explained.

In the state illustrated in FIG. 7, at the position that is on the bottom portion within the recess portion 203 of the vacuum aspiration head 205 and that is substantially right under the electrode guide 75, there is disposed a detecting electrode 223 for detecting, by electrical conduction, that the stick-shaped electrode 39 has penetrated through the electrode guide means 41.

The detecting electrode 223 is connected to the minus side of a direct-current power source 227 via a lead wire 225. The plus side of the direct-current power source 227 is slidably connected, via a lead wire 229, to the stick-shaped electrode 39 located on the upside of the electrode guide means 41. Accordingly, when a lower end of the stick-shaped electrode 39 is brought into contact with the detecting electrode 223, there is formed an electric circuit in which the electric current from the direct-current power source 227 flows through the lead wire 229, stick-shaped electrode 39, and lead wire 225.

Also, an electrical-conduction detector 231 is disposed in parallel with the direct-current power source 227. The electrical-conduction detector 231 is configured to detect a voltage drop due to the contact between the stick-shaped electrode 39 and the detecting electrode 223 and to detect the electrical conduction.

Incidentally, regarding the electrical-conduction detector 231, it may also be arranged such that the detector 231 detect an electric current flowing through the circuit as a result of the contact between the stick-shaped electrode 39 and the detecting electrode 223. Also, if making the vacuum aspiration head 205 using an electrical conductor and if connection is made, via the lead wires 233 and 225, between the vacuum aspiration head 205 and the minus side of the direct-current power source 227, it is also possible to use the vacuum aspiration head 205 itself as the substituent of the detecting electrode 223.

Hereinafter, the operation that, in the above-described small hole electrical discharge machining apparatus 1, is performed when inserting the stick-shaped electrode 39 into the electrode guide means 41 using the above-constructed electrode inserting apparatus 201 will be explained.

First, the electrode guide means 41 is moved and positioned, by appropriately driving the X-axis and Y-axis of the slide base 17 such that the electrode guide means 41 provided on the slide base 17 is located right above the electrode inserting apparatus 201.

Subsequently, by lowering the Z-axis slide 19, the electrode holder 79 constructing the electrode guide means 41 is inserted into the vacuum aspiration head 205 up to a position where the lower portion of the electrode holder 79 gets engaged with the upper portion of the vacuum aspiration head 205.

Subsequently, the electrode holding means 27 having fitted therein the stick-shaped electrode 39 is moved down while the Z-axis is being controlled such that the lower end portion of the stick-shaped electrode 39 is inserted into the upper electrode guide 101 constructing the electrode guide means 41 as well as into the lower electrode guide 75. Simultaneously, on the other hand, by operating the exhaust means 215, the air within the vacuum aspiration head 205 is exhausted, thereby to aspiration-draw the stick-shaped electrode 39 and insert it into the electrode guides 107 and 75.

As described above, through the aspiration-drawing operation of the vacuum aspiration head 205, the stick-shaped electrode 39 is fed-in from up while it is being pulled downwards. Therefore, even when the electrode is one whose diameter is as very small as 0.01 mm to 0.03 mm or so, it can be reliably inserted into the electrode guides 101, 75 without being buckled.

Also, if the stick-shaped electrode 39 has penetrated through the electrode guide 75, the lower end portion arrives at the detecting electrode 223. As a result of this, the penetration through the electrode guide 75 is detected by the electrical-conduction detector 231.

If it has been detected that the stick-shaped electrode 39 has penetrated through the electrode guide means 41, electrical-discharge working can be performed through moving the electrode guide means 41 to the working position.

Incidentally, although in the insertion of the stick-shaped electrode 39 into the electrode guide means 41, there is not used the technique of guiding the electrode 39 with a water jet that envelopes the electrode 39 from around the same 39, concurrently using the water jet can of course be also performed.

Also, according to the present invention, since through the aspiration-drawing operation of the vacuum aspiration head the stick-shaped electrode is fed into the electrode guide while it is b ing pulled downwards, even when the electrode is one whose diameter is as very small as 0.01 mm to 0.03 mm or so, it can be reliably inserted into without being buckled.

The present disclosure relates to subject matter contained in Japanese Patent Application Nos. 2002-109050, filed on Apr. 11, 2002, and 2002-193235, filed on Jul. 2, 2002, the contents of both are herein expressly incorporated by reference in their entireties.

What is claimed is:

1. A small hole electrical discharge machining apparatus comprising:
    an electrode holder that holds an upper part of an electrode;
    an electrode guider that guides a lower part of the electrode;
    a jet nozzle that injects a water jet to the electrode holder; and
    a fluid channel that supplies a gas to an electrode guide, wherein the electrode guider comprises:
    an electrode guide sleeve having the electrode guide at its lower end, the electrode guide sleeve extending into an electrode holding member so that the electrode guide protrudes from a lower end of the electrode holding member;
    an inner sleeve provided within the electrode guide sleeve and which is coaxial with the electrode guide;
    a spacer which holds, in the interior of the electrode holding member, an upper electrode guide to be coaxial with the electrode guide;
    a fluid channel provided in the spacer and guiding a gas supplied from a gas supply port provided in the electrode holding member into an electrode guiding hole of the inner sleeve; and
    a fixing member provided above the spacer and having a funnel portion for guiding the water jet into a through hole of the upper electrode guide,
    and wherein the electrode is guided with the water jet toward a workpiece, and small hole electrical discharge machining is performed while the gas is released from the electrode guide into a working liquid via the fluid channel.

2. A small hole electrical discharge machining apparatus according to claim 1, wherein the gas comprises air.

3. An electrode inserting method for a small hole electrical discharge machining apparatus having an electrode holder that holds an upper part of an electrode and an electrode guider that guides a lower part of the electrode, the electrode being fed to a workpiece while the electrode is being rotated, the electrode inserting method comprising:
    engaging a lower part of the electrode guider with a vacuum aspiration head that is removably engageable therewith; and
    inserting the electrode into the electrode guide guider by suction power of the vacuum aspiration head.

4. A small hole electrical discharge machining apparatus comprising:
    an electrode holder that holds an upper part of an electrode;
    an electrode guider that guides a lower part of the electrode;
    a jet nozzle that injects a water jet to the electrode holder;
    a vacuum aspiration head that is detachably attached to a lower part of the electrode guider;
    an electrode insertion apparatus having an electode penetration detector that detects that the electrode has penetrated through the electrode guider; and
    a motor that rotates the electrode guider and the electrode while small electrical discharge machining is performed,
    the vacuum aspiration head comprising:
    a concave recess portion which is detachably attached to the lower part of the electrode guide guider; and
    an exhauster that exhausts air within a sealed space that is formed by engagement between the electrode guider and the concave recess portion, and
    the electrode penetration detector further comprising, in the vacuum aspiration head, a detecting electrode which is contactable with a lower end of the electrode and an electrical-conduction detector which is in an electric circuit formed upon contact of the detecting electrode with the lower end of the electrode, and the electrical-conduction detector is configured to detect the electrical conduction between the electrode and the detecting electrode,
    and wherein the electrode is guided with the water jet toward a workpiece, and small hole electrical discharge machining is performed while a gas is released from the electrode guider into a working liquid via a fluid channel.

5. A small hole electrical discharge machining apparatus according to claim 4, wherein the gas comprises air.

* * * * *